United States Patent
Timmer

[11] Patent Number: 5,905,809
[45] Date of Patent: May 18, 1999

[54] METHOD OF AND APPARATUS FOR COMPUTED TOMOGRAPHY

[75] Inventor: Jan Timmer, Eindhoven, Netherlands

[73] Assignee: U.S. Philips Corporation, New York, N.Y.

[21] Appl. No.: 08/665,592

[22] Filed: Jun. 18, 1996

Related U.S. Application Data

[63] Continuation of application No. 08/304,738, Sep. 12, 1994, abandoned.

[30] Foreign Application Priority Data

Nov. 10, 1993 [BE] Belgium ................................ 9301243

[51] Int. Cl.⁶ .............................. G06K 9/00; G06K 9/40; G06K 9/64; G06F 15/316
[52] U.S. Cl. .......................... 382/131; 382/254; 382/279; 378/4; 378/17; 378/23; 348/77
[58] Field of Search ..................................... 382/131, 132, 382/254, 255, 278, 279; 364/413.13, 413.14, 413.16, 413.17, 413.19, 413.23; 378/4, 17, 23; 348/77, 162

[56] References Cited

U.S. PATENT DOCUMENTS

| | | | |
|---|---|---|---|
| 4,149,081 | 4/1979 | Seppi ........................................ | 364/414 |
| 4,599,742 | 7/1986 | Kikuchi et al. ........................... | 378/99 |
| 5,140,520 | 8/1992 | Matsumura ........................ | 364/413.21 |
| 5,148,499 | 9/1992 | Matsumura .............................. | 382/131 |
| 5,315,506 | 5/1994 | Wang et al. ........................ | 364/413.19 |
| 5,440,647 | 8/1995 | Floyd, Jr. et al. ...................... | 382/132 |
| 5,577,501 | 11/1996 | Flohr et al. .............................. | 382/131 |

FOREIGN PATENT DOCUMENTS 0353299  2/1990  European Pat. Off. ................... 382/6

OTHER PUBLICATIONS

"Physical Characteristics of Scattered Radiation in Diagnostic Radiology: Monte Carlo Simulation Studies" H. Chan et al, Med Phys. 12(2), pp. 152–165 (1985).

"Deconvolution of Compton Scatter in Spect" C. Floyd Jr. et al, Journal of Nuclear Medicine, vol. 26, No. 4, pp. 403–408 (Apr. 1985).

*Primary Examiner*—Bipin Shalwala
*Attorney, Agent, or Firm*—Dwight H. Renfrew, Jr.

[57] ABSTRACT

A patient (7) is irradiated by an X-ray source (1) in a computed tomography apparatus. The radiation is subsequently detected by the detector cells (5) of a position-sensitive X-ray detection system (4) and the intensities detected are applied to a computing device (16). Absorption as well as elastic and inelastic scattering of X-rays occur within the patient (7). The data acquired is corrected for elastic (coherent) scatter by deriving a deconvolution function from the elastic scatter function, which deconvolution function is applied to the data. The elastic scatter function is determined, for example by a computer simulation.

9 Claims, 2 Drawing Sheets

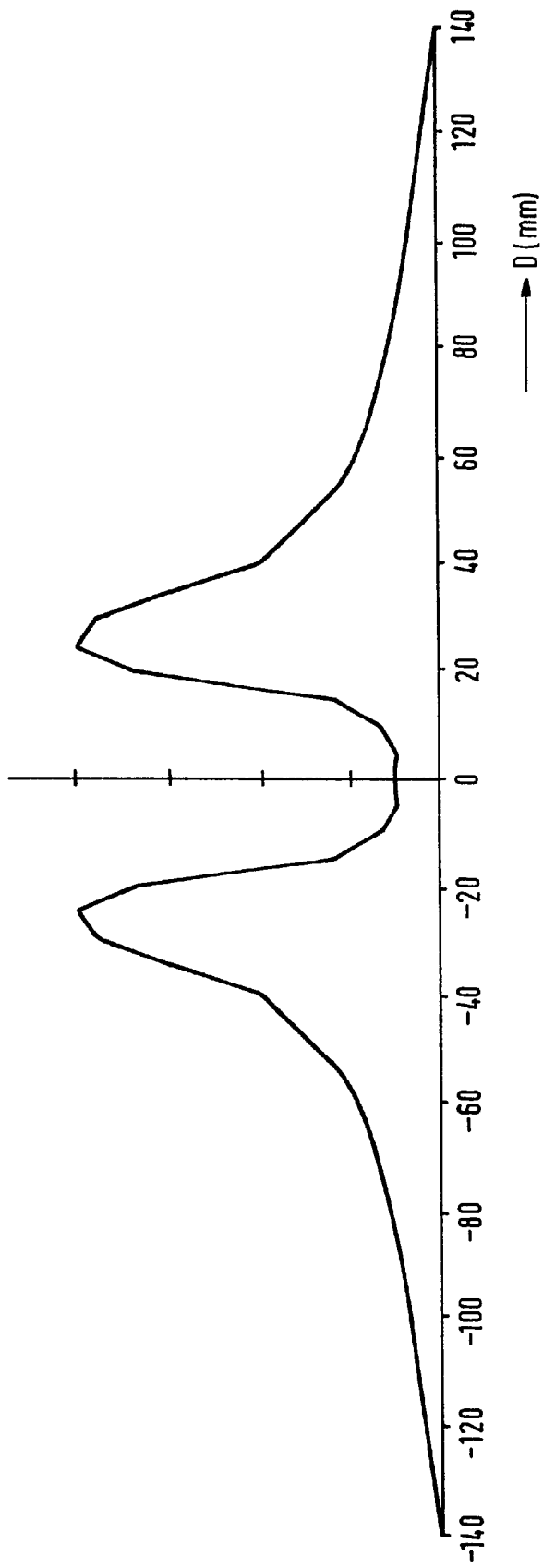

METHOD OF AND APPARATUS FOR COMPUTED TOMOGRAPHY

This is a continuation of application Ser. No. 08/304,738 filed Sep. 12, 1994.

BACKGROUND OF THE INVENTION

1. Field of the Invention

The invention relates to a method of computed tomography in which X-rays from an X-ray source irradiate an object to be examined and are detected by means of a position-sensitive X-ray detector array which occupies a substantially fixed position relative to the X-ray source, the X-ray source and the X-ray detector array being moved together in a number of orientations relative to the object to be examined in order to pick up a number of X-ray images, a density distribution of the object being reconstructed by means of the detected X-ray images and unsharpness in the reconstructed image being reduced by means of deconvolution. The invention also relates to an apparatus for carrying out such a method.

2. Description of the Related Art

Such an apparatus and method are known from EP-A 0 353 299, which corresponds to U.S. Pat. No. 5,120,520. The cited publication describes a method of processing data acquired by means of a computed tomography apparatus (CT scanner) in which the X-ray source emits radiation which originates not only from a focal point but also, unintentionally, from the surroundings of the focal point. These undesirable X-rays are caused by scattering of electrons within the X-ray tube and, consequently, the X-rays originate from an extensive area. Because the X-ray source is no longer substantially punctiform, the reconstructed image contains unsharp edges and artefacts. In the known method the image artefacts caused by the source are reduced by deconvolution with a PSF (point spread function) describing the characteristics of the X-ray source.

In CT scanners in which the problem described in EP-A 0 353 299 does not occur, or in which this problem has been adequately mitigated, unsharpness and artefacts still occur in the reconstructed images. Notably a loss of contrast occurs. These image artefacts can be attributed partly to incoherent (Compton) scattering. Incoherent scattering is uniformly distributed in space and the effects thereof can be removed during reconstruction by subtracting a constant value from the signal measured by each cell in the detector. Said constant value is dependent on the dimensions of the object to be examined. Taking incoherent scatter into account in this manner results in a substantial improvement of the reconstructed image.

However, it has been found that a given degree of unsharpness and artefacts remain in the reconstructed image also after the above correction.

SUMMARY OF THE INVENTION

It is the object of the invention to identify the source of the remaining image defects and to provide a method for reducing the consequences thereof in the reconstructed image.

To this end, the invention is characterized in that for deconvolution use is made of a deconvolution function which contains a component derived from elastic (coherent) scattering of X-rays in the object. It has been found that such a deconvolution function results in an enhanced image compared to the situation where elastic scattering is not taken into account as a source of image defects. This method is useful notably when the position-sensitive detector comprises solid-state detectors. Such detectors do not have inherent discrimination against scattered radiation.

It is to be noted that compensation for Compton scatter by means of a deconvolution algorithm is known per se from the article "Deconvolution of Compton scatter in SPECT" by C. E. Floyd et al., published in J. Nucl. Med., Vol. 26, No. 4, pp. 403–408 (April 1985). The cited article concerns a correction for a type of scatter other than that of the present invention, i.e. inelastic scatter. SPECT is a technique which essentially deviates from computed tomography. In SPECT radiation is detected which arises within the object to be examined after introduction of radioactive substances. In such a system scatter causes unsharpness notably because the position of the radiation source becomes unclear due to scattering.

An embodiment of the invention is characterized in that the deconvolution function is determined by way of a statistical technique. Elastic scattering is directed substantially forwards and is dependent on the quantity of matter traversed. Even for a simple shape, therefore, analytical calculation of adequate precision is not possible. Elastic scatter, therefore, is highly dependent on the shape and the dimensions of the object to be measured. This is of significance notably because in a CT scanner the object is irradiated from a large number of angles. A statistical technique enables determination of a sufficiently accurate description of the deconvolution function in this situation.

This version is preferably characterized in that the deconvolution function is determined by means of a Monte Carlo method. A reasonable estimate can thus be made of the degree of elastic scatter in an object having an arbitrary shape and an internal structure in which local variations of the degree of scatter occur. A Monte Carlo method also offers the advantage that it can also be used for determining the effects of other sources of defects, for example the X-ray source not being punctiform, incoherent scatter, etc.

An embodiment of the invention is characterized in that the deconvolution function is determined and parameterized as a function of the dimensions of the object. By determining a deconvolution function for some objects of different dimensions, accurate parameterization can be achieved by interpolation for all dimensions within a given range.

A further embodiment of the invention is characterized in that the deconvolution function also contains a component derived from incoherent (Compton) scatter. The determination of the deconvolution function as well as the use of deconvolution for correction of elastic scatter can be combined with deconvolution for correction of other image defects, notably correction for incoherent scatter.

The invention also relates to a device for reconstructing a computed tomography image. The device in accordance with the invention is characterized in that the computing means incorporate a deconvolution function which contains a component which represents the effect of elastic scattering (coherent scattering) of X-rays in the object. The deconvolution function can be stored in the computing means, for example in the form of a table or in parameterized form. Preferably, this compensation is applied when the position-sensitive detector array comprises solid-state detectors which have a sensitivity which is higher than that of gas-filled detector cells, but which do not have inherent discrimination against scattered radiation.

BRIEF DESCRIPTION OF THE DRAWINGS

These and other, more detailed, aspects of the invention will be described in detail hereinafter, by way of example, with reference to the drawings.

Therein:

FIG. 2 shows a function representing the effect of elastic scattering. The function shown is referred to herein as a "coherent scatter function" or a "deconvolution function".

DETAILED DESCRIPTION OF THE PREFERRED EMBODIMENTS

Figure 1:
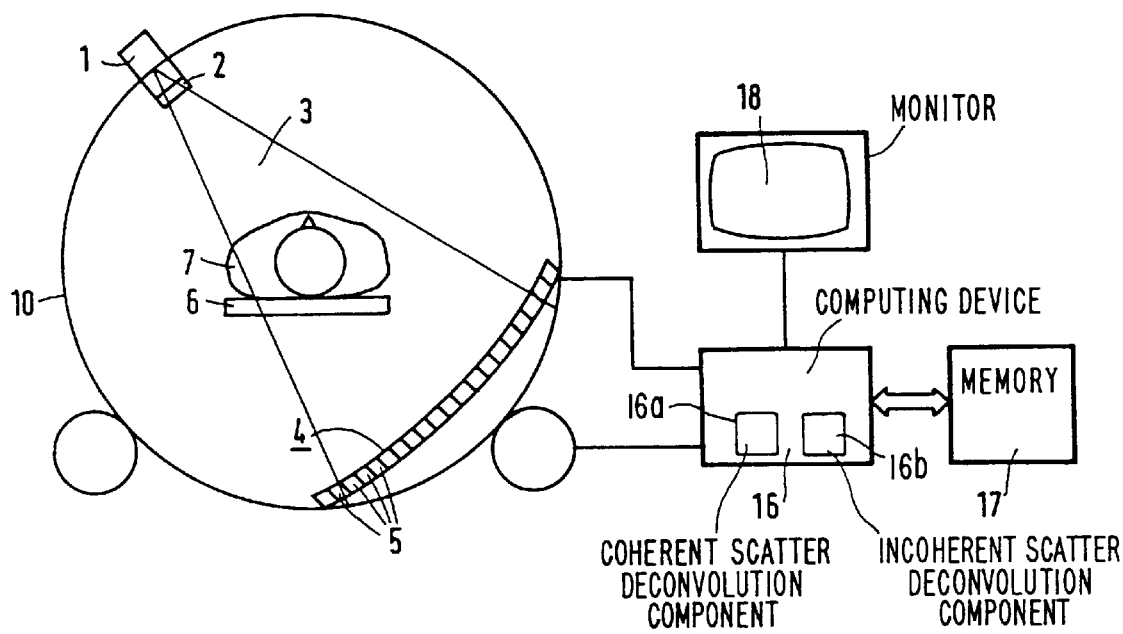
FIG. 1 shows diagrammatically a computed tomography apparatus or CT scanner.

FIG. 1 shows diagrammatically a computed tomography apparatus. It comprises an X-ray source 1, preferably an X-ray tube, for forming a fan-shaped diverging flat beam 3 of X-rays in conjunction with a slit-shaped diaphragm 2. An array 4 of separate detector cells 5 is arranged opposite the X-ray source 1. The cells together constitute a position-sensitive X-ray detection system. The detector cells 5 may be gas (xenon) filled detectors or solid-state detectors. The thickness of the flat beam 3 halfway between the X-ray source and the detection system is generally between 1 and 10 mm. The intensity of the radiation incident on a detector cell 5 is determined first of all by the absorption in an object or patient 7 to be examined which is arranged on a table 6 between the X-ray source 1 and the detector array 4. By rotating the X-ray source 1 and the detector array 4 together, by means of a frame 10, around the object or the patient 7, the absorption is measured along a large number of lines from a large number of different directions. Rotation may be continuous as well as intermittent. It is also possible to displace the object or the patient 7 in the direction of the axis of rotation during rotation and irradiation, so that via the detector cells data is acquired from a significant three-dimensional volume of the object or the patient 7. Besides a rotating system comprising an X-ray source and a detector, the apparatus may also comprise a detection system which does not rotate but which extends around the patient along the entire circumference. For the X-ray source use can then be made of an annular anode around the patient, the point of incidence of the electron beam with the annular anode then moving around the patient.

The X-ray source is rotated to a number of positions in order to acquire from the detector a number of series of detected radiation intensities.

In any position of the X-ray source 1 and the detector array 4 a series of detected radiation intensities from the detector cells is digitized and applied to a computing device 16 which incorporates a deconvolution function component 16a for correction of coherent scatter and a deconvolution function component 16b for correction of incoherent scatter. After correction for known defect sources and disturbances including the effects of scattering, an image is reconstructed by the computing device 16 from the measurement data stored in the form of an image matrix in a memory 17. This image is made visible at the same time, or at a later stage, via a reproduction device. The reproduction device may be a monitor 18 as well as any other suitable equipment, for example a printer or a laser-copier whereby a hard copy on paper or transparent film can be made.

The intensities detected by the cells 5 are determined not only by absorption along the lines between the X-ray source 1 and the detector cells 5, but also by scattering of X-rays in the object or the patient 7. Scattered radiation is distributed substantially uniformly in space and does not contain information regarding the object to be examined. Scatter has two effects: first of all, a smaller amount of the radiation emitted by the X-ray source in the direction of a cell is detected by the relevant cell, and secondly a cell detects additional radiation emitted by the X-ray source in another direction and scattered to the relevant cell in the object, ambient air or structural elements of the device. Scattering degrades the contrast in the reconstructed image. Scattering also causes artefacts such as shadow effects, unsharp transitions between different types of tissue, bright stripes between areas of high density and alinearity, i.e. the logarithm of the absorption is not proportional to the path length covered, multiplied by the absorption of the part of the object between the X-ray source and the detector cell.

The scatter is substantially all incoherent scatter. Such scatter is uniformly distributed in space and can be comparatively simply compensated for by reducing the intensities detected by a constant value. This constant value is dependent on the amount of matter, i.e. the dimensions of the object or the patient 7, and on the type of matter.

It has been found that given image defects and artefacts remain in the reconstructed image even after optimization of the compensation for uniformly distributed radiation. This is the case notably when the detector cells are solid-state detectors. In accordance with the invention these artefacts are removed from the image by applying compensation for elastic (coherent) scatter in addition to the compensation for incoherent scatter. Compensation for elastic scatter is achieved by deconvolution of the measurement data acquired with a coherent scatter function. FIG. 2 shows the form of such a function. The intensity is plotted in arbitrary units on the vertical axis and the position along the detector array 4, as measured from the point of incidence for non-scattered radiation on the detector array, is plotted on the horizontal axis. The distance shown corresponds to the distance on a typical clinical CT scanner. The scatter function is symmetrical relative to the origin. The form of the scatter function has been determined by means of a statistical Monte Carlo technique where for a standard object (phantom) assumptions are made as regards the probability that X-rays are elastically scattered and also as regards the angle at which such scattering takes place. The assumptions made are based on measured values of these variables. Such a Monte Carlo technique, used to determine incoherent radiation, is described, for example in the article "Physical characteristics of scattered radiation in diagnostic radiology: Monte Carlo simulation studies" by Heang-Ping Chan et al., published in Med. Phys. 12(2), pp. 152–165 (1985). After determination of this function for objects of different dimensions and as a function of the detection system, the scatter function can be parameterized in dependence on the object dimensions.

The compensation for coherent scatter is realized as follows. The effect of coherent scatter on the intensity $I_i$ incident on a detector cell i can be described as a convolution of the non-scattered X-ray signal I':

$$I_i = \sum_{j=-n}^{n} c_j \cdot I'_{i-j},$$

where $C_j$ is the value of the coherent scatter function and $I'_{i-j}$ is the intensity of the radiation in the direction of a detector cell at a distance i–j from the cell i. The fraction of the radiation which is not incident on the cell i due to scattering is $$F = \sum_{\substack{j=-n \\ j \neq 0}}^{n} c_j$$

and the variation of intensity in the cell i, i.e. the central value of the function $C_{j=0}=0=1-F$. The degree of scatter, and hence the vertical scale of the function in FIG. 2, is proportional to the dimensions of or the amount of matter in the object.

Because the contribution of the elastic scatter is comparatively small, i.e. less than 10%, the reciprocal of the scatter function constitutes a suitable approximation of the correction function: $\tilde{C}_k = -C_k$, for $k \neq 0$ and $\tilde{C}_k = 1+F$ for $k=0$. The corrected value of the intensity then becomes:

$$I'_i = I^0_i \cdot \sum_{k=-n}^{n} \tilde{c}_k \frac{I_{i-k}}{I^0_{i-k}},$$

where I and I' are the measured intensity and the corrected intensity, respectively, and $I^0$ is a reference value representing the sensitivity of the detector cells. This procedure should be repeated for each exposure from a different direction.

The deconvolution function shown in FIG. 2 has been determined experimentally as the elastic scatter from a phantom. Using a statistical method, notably a Monte Carlo method, it is readily possible to determine the deconvolution function for objects or bodies having a complex internal structure. The effects of irradiation from different directions can then also be taken into account. Evidently, such a detailed determination requires more computer capacity and the processing of the data acquired also requires more computer capacity.

I claim:

1. A method of computed tomography, in which X-rays from an X-ray source irradiate an object to be examined and are detected by means of a position-sensitive X-ray detector array which occupies a substantially fixed position relative to the X-ray source to detect a series of radiation intensities, the X-ray source being moved in a number of orientations relative to the object to be examined in order for the X-ray detector to pick up a number of detected series of intensities, a density distribution of the object being reconstructed from a number of series of measured intensities derived from the number of series of detected intensities and unsharpness in the reconstructed image being reduced by applying to the number of series of measured intensities a deconvolution function which contains a component for correcting for coherent scattering of X-rays in the object, which deconvolution function is determined experimentally by way of a statistical technique which takes into account the effect of irradiation of the object from the different orientations of the X-ray source relative to the object.

2. A method as claimed in claim 1, wherein the deconvolution function is determined by means of a Monte Carlo method.

3. A method as claimed in claim 1, wherein the deconvolution function is determined and parameterized as a function of the dimensions of the object.

4. A method as claimed in claim 1, wherein the deconvolution function also contains a component for correcting for an effect of incoherent (Compton) scatter.

5. A computed tomography apparatus, comprising an X-ray source and a position-sensitive X-ray detector array for irradiating an object to be examined, situated between the X-ray source and the X-ray detector array, by means of X-rays, means for rotating the X-ray source relative to the object and for picking up a number of series of detected radiation intensities in a number of orientations of the X-ray source relative to the object, and computing means for reconstructing, on the basis of the number of series of detected radiation intensities, a density distribution of the object, wherein for the purpose of reducing image defects in the reconstructed image the computing means is configured to use a deconvolution function which has been determined experimentally by way of a statistical technique which takes into account the effect of irradiation of the object from the different orientations of the X-ray source relative to the object and contains a component for correcting for coherent scattering of X-rays in the object.

6. A method as claimed in claim 2, wherein the deconvolution function is determined and parameterized as a function of the dimensions of the object.

7. A method as claimed in claim 2, wherein the deconvolution function also contains a component for correcting for an effect of incoherent (Compton) scatter.

8. A method as claimed in claim 3, wherein the deconvolution function also contains a component for correcting for an effect of incoherent (Compton) scatter.

9. A method as claimed in claim 6, wherein the deconvolution function also contains a component for correcting for an effect of incoherent (Compton) scatter.

* * * * *